United States Patent
Nett et al.

(10) Patent No.: US 10,052,950 B2
(45) Date of Patent: Aug. 21, 2018

(54) SELECTABLE DIFFERENTIAL

(71) Applicant: GKN Driveline International GmbH, Lohmar (DE)

(72) Inventors: Hans-Peter Nett, Adenau (DE); Sven Herber, Hürth (DE); Thomas Weckerling, Sankt Augustin (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 161 days.

(21) Appl. No.: 15/303,073

(22) PCT Filed: Apr. 30, 2014

(86) PCT No.: PCT/EP2014/058893
§ 371 (c)(1),
(2) Date: Oct. 10, 2016

(87) PCT Pub. No.: WO2015/165537
PCT Pub. Date: Nov. 5, 2015

(65) Prior Publication Data
US 2017/0028848 A1    Feb. 2, 2017

(51) Int. Cl.
*B60K 23/08*    (2006.01)
*B60K 17/16*    (2006.01)
(Continued)

(52) U.S. Cl.
CPC ............ *B60K 23/08* (2013.01); *B60K 17/165* (2013.01); *F16H 48/08* (2013.01); *F16H 48/40* (2013.01);
(Continued)

(58) Field of Classification Search
CPC ...... F16H 57/0483; F16H 48/08; F16H 48/40; F16H 57/037; B60K 23/08; B60K 17/165; B60Y 2400/80
(Continued)

(56) References Cited

U.S. PATENT DOCUMENTS 6,027,422 A * 2/2000 Yamazaki ............. B60K 23/04
                                                        192/53.36
7,074,150 B2 * 7/2006 Fusegi .................. B60K 23/04
                                                        475/150
(Continued)

FOREIGN PATENT DOCUMENTS

CN    102369373 A    3/2012
CN    103273842 A    9/2013
(Continued)

OTHER PUBLICATIONS

JP Office Action dated Dec. 22, 2017 (with English translation; 10 pages).
(Continued)

*Primary Examiner* — Roger L Pang
(74) *Attorney, Agent, or Firm* — Bejin Bieneman PLC

(57) ABSTRACT

In a differential that is part of a selectively disconnectable or connectable secondary powertrain, a clutch device allows the input member of the differential, via which driving power is introduced into the differential, to be uncoupled from the output members to which the driving power is forwarded in a branched manner in order to be able to completely shut off part of the secondary powertrain in the disconnected state.

18 Claims, 4 Drawing Sheets

(51) Int. Cl.
*F16H 48/08* (2006.01)
*F16H 48/40* (2012.01)
*F16H 57/037* (2012.01)
*F16H 57/04* (2010.01)

(52) U.S. Cl.
CPC ....... *F16H 57/037* (2013.01); *F16H 57/0471* (2013.01); *F16H 57/0483* (2013.01); *B60Y 2306/03* (2013.01); *B60Y 2400/422* (2013.01); *B60Y 2400/80* (2013.01); *B60Y 2410/10* (2013.01)

(58) Field of Classification Search
USPC .................................. 475/222, 230; 180/247
See application file for complete search history.

(56) References Cited

U.S. PATENT DOCUMENTS

| | | |
|---|---|---|
| 2005/0261101 A1 | 11/2005 | Yoshioka |
| 2006/0014602 A1 | 1/2006 | Sayama |
| 2006/0046890 A1 | 3/2006 | Aikawa |
| 2008/0308340 A1* | 12/2008 | Nishimoto ............. B60K 17/08 180/378 |
| 2009/0312137 A1* | 12/2009 | Rohs ...................... F16H 15/42 475/214 |
| 2010/0022345 A1* | 1/2010 | Reaser ................... F16D 55/36 475/241 |

FOREIGN PATENT DOCUMENTS

| | | |
|---|---|---|
| DE | 3913487 A1 | 11/1989 |
| DE | 102008063904 A1 | 7/2010 |
| EP | 1293373 A2 | 3/2003 |
| EP | 2419036 A2 | 2/2012 |
| JP | 2002370557 A | 12/2002 |
| JP | 2003080962 A | 3/2003 |
| WO | 2013045444 A1 | 4/2013 |

OTHER PUBLICATIONS

International Preliminary Report on Patentability for PCT/EP2014/058893 dated Nov. 1, 2016 (with English translation; 22 pages).
International Search Report for PCT/EP2014/058893 (with English translation; 7 pages).
First Office Action from Chinese Intellectual Property Office for CN Application No. 2014800785607 dated Apr. 4, 2018 (18 pages).

* cited by examiner

SELECTABLE DIFFERENTIAL

CROSS-REFERENCE TO RELATED APPLICATIONS

This application is a national stage of, and claims priority to, Patent Cooperation Treaty Application No. PCT/EP2014/058893, filed on Apr. 30, 2014, which application is hereby incorporated herein by reference in its entirety.

BACKGROUND

The present disclosure relates to a differential of a motor vehicle, in particular an axle differential of a passenger vehicle, having an input member, via which the drive power is introduced into the axle differential, and two output members, via which the drive power is transmitted to power consumers, and having a differential unit which acts in a positive-locking manner and which is arranged between an input member and output members and which has differential members of a differential mechanism, and via which the drive power can be transmitted from the input member in a branched manner to the output members with a differential speed being allowed between the output members.

Such axle differentials are generally known in the prior art and are an object of substantially each motor vehicle. They are used in particular to compensate for the differential speeds of a driven wheel on the inner side of a bend and the driven wheel at the outer side of a bend of the same axle during travel round bends.

In cases in which the drive train of a motor vehicle has a permanently driven primary drive train, to which a secondary drive train can be connected in order to produce all-wheel drive (sometimes referred to as a hang-on all-wheel concept), it may be advantageous to completely decouple the secondary drive train components from the primary drive train when the secondary drive train is not driven and to stop them, that is to say, to decouple them both from the primary drive train and from the secondary drive wheels. Power losses, in particular drag losses, in the disconnected, stopped secondary drive train, which can otherwise be caused by friction losses (toothed wheels in engagement, occurrences of bearing friction), by splash losses (components which are introduced into oil reservoirs) or by additional rotational acceleration requirement, when the secondary drive train components are dragged during travel by the wheels of the secondary drive train which roll on the road, are thereby prevented. The secondary drive train components which may advantageously be intended to be stopped may also include components of an axle differential which is provided in the secondary drive train.

Such a drive concept is disclosed in EP2419036 A2 in the case of use of a compensation unit which does not operate in a positive-locking manner and in which furthermore a synchronization device having a braking device is provided in the region of a PTU (Power Take-Off Unit), via which device not only can the secondary drive train be decoupled from the primary drive train, but in addition it is also ensured that the components of the switched-off secondary drive train can be completely stopped. As a result of the arrangement of the synchronization device and the braking device on the PTU, however, those components act in a remote manner from the components which form the substantial mass of the components to be stopped. The mapping of that synchronization and braking function in the entire brake train is thereby not very compact and the forces which are intended to be applied during the synchronization and braking operation are able to be ensured only by components of a powerful actuator system, which components have to have relatively large dimensions. This is particularly the case when the drive train does not have a differential-free, clutch-controlled compensation unit as disclosed in EP2419036 A2, but instead a conventional differential mechanism which is formed by heavy components and which operates in a positive-locking manner is provided.

SUMMARY

As disclosed herein it is possible to construct the mechanical mechanisms which are used for disconnecting and connecting a secondary drive train with respect to a permanently driven primary drive train in a generally more central, more compact and more durable but nevertheless energy-efficient manner.

Accordingly, disclosed herein is a clutch device which is arranged in the drive power flow between the input member and output members and by means of which the output members and the input member can be decoupled from each other.

An additional first partial aspect of such a differential is that the connection of the secondary drive train, that is to say, the switch from Disconnect 2WD (two-wheel drive) operation (hereinafter Disconnect operation) to Connect AWD (all-wheel drive) operation (hereinafter Connect operation) with respect to the primary drive train has to be carried out in a synchronized manner during travel via a clutch device which acts in a positive-locking manner, that is to say, a speed adaptation must occur between the components which are intended to be coupled in a positive-locking manner in order to allow the positive-locking mutual engagement of the power-transmitting components. Such a synchronization must be readily introduced into the overall construction, should take up little additional structural space, be constructed in a structurally simple manner, and be able to be operated in an operationally reliable and rapidly reacting manner.

Relevant to that first partial aspect is that the differential has an external differential basket which is connected to the input member and an internal differential basket which receives the differential mechanism which acts in a positive-locking manner, and the differential comprises a synchronization unit which is arranged between the external differential basket and the internal differential basket and by means of which the speeds of the external differential basket and the internal differential basket can be adapted for a connection operation.

An additional second partial aspect relates to the dragging loss minimization during Disconnect operation. In this instance, it is intended to be ensured that the components of the differential can be stopped in a manner which is as comprehensive as possible, that is to say, the significant portion of the mass of the components forming the secondary drive train is not also dragged, a portion of the bearings and toothed wheels which is as large as possible is stationary, and the need for lubrication is dispensed with as extensively as possible. In the ideal case, the connectable all-wheel drive does not cause any additional dragging power with respect to a vehicle which does not even have a connectable secondary drive train in the event that the secondary drive train is not connected.

Dragging loss minimization is solved in that the differential members of the differential mechanism are axially and radially guided and supported inside an internal differential basket, respectively. The internal differential basket is then guided in a differential housing and/or in an external differential basket.

On the one hand, an internal differential member is thereby prevented from carrying out a rotation movement relative to an adjacent component during a Disconnect operation during straight travel, with respect to which it is guided by means of a bearing. On the other hand, such a configuration results in the differential mechanism, which includes in particular the compensation wheels, the compensation wheel carriers and the lateral wheels of the differential, not having any need for lubrication during Disconnect since the differential mechanism can rotate as a whole en bloc. Furthermore, friction caused by toothed wheel engagements is also not produced during straight travel. The differential unit, which rotates with the lateral shafts and to which an internal differential basket of the differential should also be attributed in addition to the differential members of the differential mechanism, can thus be supported in a differential housing and/or in an external differential basket in a low-friction manner without itself producing substantial internal power losses.

The external differential basket may be constructed as a laterally open, cup-like differential basket. That construction allows the arrangement of the clutch device and a synchronization at the side of the lateral opening of the differential basket and allows simple insertion of the differential unit with the internal differential basket into the laterally open external differential basket during assembly. A ring gear which is provided as an input member may be arranged at the outer periphery of the external differential basket. A cup-like construction means in particular that the opening cross-section, which the external differential basket forms in an axial direction from the narrowest location thereof, expands or remains constant.

Further, the external differential basket may be supported in the differential housing via the external lateral edge of the lateral opening facing the clutch device. Such a bearing with a roller bearing which is increased with respect to a conventional bearing provides additional space radially inside the bearing for the clutch device, the synchronization, the braking device, and the actuator system necessary for the actuation of the components. Accordingly, the clutch device and/or the synchronization and/or the braking device and/or the actuator system necessary for the actuation of those components may be located at least partially radially inside the bearing of the external differential basket.

The mentioned configuration further allows a force flow to be ensured during Connect operation from the outer side to the inner side, that is to say, from the ring gear (input member) via the external differential basket and the clutch device to the internal differential basket.

Finally, a third partial aspect of the differential mentioned above relates to the decoupling operation, that is to say, the transition from Connect to Disconnect operation. There is intended to be connected downstream of this operation a braking of the secondary drive train components in order to be able to ensure that the secondary drive components do not continue to rotate as a result of after-running effects or as a result of hydrodynamic friction effects and do not cause undesirable dragging power. A braking device must, on the one hand, be able to ensure adequate braking forces in order to be able to brake the entirety of the secondary drive train components rapidly. Since the time portions during Connect operation when viewed over the service-life of the vehicle are typically very small, it should be ensured, on the other hand, that the braking of the secondary drive train components can be carried out automatically per se and in a passive manner. The term "per se" means that the brake actuation during Disconnect operation is applied by the system itself (for example, by integrated and correspondingly arranged resilient elements) and the term "passive" means that the brake is retained in a permanently actuated state during Disconnect operation without a brake actuation force having to be produced for this purpose in a permanent and active manner, such as, for example, by means of provision of a permanently applied hydraulic pressure or other active energy supply.

This third partial aspect is addressed in that there is provided on the differential a braking device which applies a braking force to the input member or to secondary drive train components which are connected to the input member in a rotationally secure manner when the output members are decoupled from the input member.

As a result of the arrangement of the braking device on the differential, it is possible to have a compact structural form in which the braking force can act directly on the secondary drive train components which substantially make up the mass to be braked. For example, a ring gear which typically constitutes the input member is engaged with a longitudinal shaft in a positive-locking manner as part of a V-drive, the longitudinal shaft being also rapidly braked.

The braking device can comprise a resilient element and can act in a resiliently loaded manner on the input member or on a secondary drive train component which is connected to the input member in a rotationally secure manner. A resilient element can, with corresponding dimensions, generate a high braking force, for the maintenance of which a continuing supply of energy is not required because a resilient element can be used as a passive component and is not dependent on a continuing supply of energy in the rest position thereof. The resilient element which provides the resilient force which is required for the braking operation can therefore be integrated in the differential in such a manner that the rest state of the resilient element is taken up during Disconnect operation in which the resilient element provides the braking force. Thus, the braking force is available during Disconnect operation permanently without supplying additional energy. The energy therefore has to be supplied only for the Connect operation which takes up substantially shorter time portions with respect to the Disconnect operation, that is to say, for the coupling operation and the permanent retention of the secondary drive members in the coupled state.

It is considered to be particularly advantageous for the resilient characteristic of the individual spring or a spring assembly which provides the braking force to be negative or at least degressive in the partial portion relevant to the application described here. The coupling force which is required to retain the decoupling device counter to the resilient force of the resilient element during Connect operation can thus be limited effectively with respect to a resilient element having a non-degressive or not truly negative resilient characteristic. At the same time, it is ensured that the braking force which the resilient element can provide during Disconnect operation may be high in relation to the coupling force with respect to a spring having a non-degressive characteristic.

It is further advantageous in the above-described configuration that the resilient element can be used as a restoring spring of the decoupling device. In this case, the resilient force acts as a restoring force which urges the clutch device out of the coupling position, in which the input member and output members are coupled together to transmit the drive power, into the decoupling position, in which the input member and output members are decoupled from each other. The coupling and synchronization are therefore carried out by means of an active supply of energy, preferably by hydraulic pressure, wherein in this case the resilient element is tensioned. The decoupling is automatically carried out when the external energy supply is switched off as a result of the relaxation of the resilient element.

In a particularly advantageous manner, a disk spring assembly or an individual disk spring is used as a resilient element, wherein the resilient element is preferably arranged or integrated in the differential in such a manner that the disk spring(s) can be deformed as far as the zero position or beyond. To this end, there may be provided between the disk springs in a disk spring assembly spacer elements which allow the deformation beyond the zero position in that they prevent the individual disk springs of the disk spring assembly from being able to move en bloc.

The position which the resilient element takes up during Disconnect operation is in this instance at one side of the zero position, and the position which the resilient element takes up during Connect operation is, in comparison with the position during Disconnect operation, directly upstream of the zero position, in the zero position itself or at the other side of the zero position after passing through the zero position.

The decoupling device can further have a pressure piston which is located radially externally in relation to the resilient element and coupling members of the clutch device. This has the advantage that the action of the pressure piston which can be in the form of an annular piston can be carried out by the housing wall in a structurally simple manner with the energy necessary for the coupling operation, and pressurized oil holes or cable or line conduits which extend inside the differential housing and which are otherwise necessary can be dispensed with. In an example, there may be provision for the lubrication oil supply for the differential mechanism and/or the bearing thereof to be carried out through the pressure piston.

The three partial aspects discussed separately above are each considered to be independent of one another, wherein they all nevertheless serve in a common and synergetic manner.

DETAILED DESCRIPTION

Figure 1:
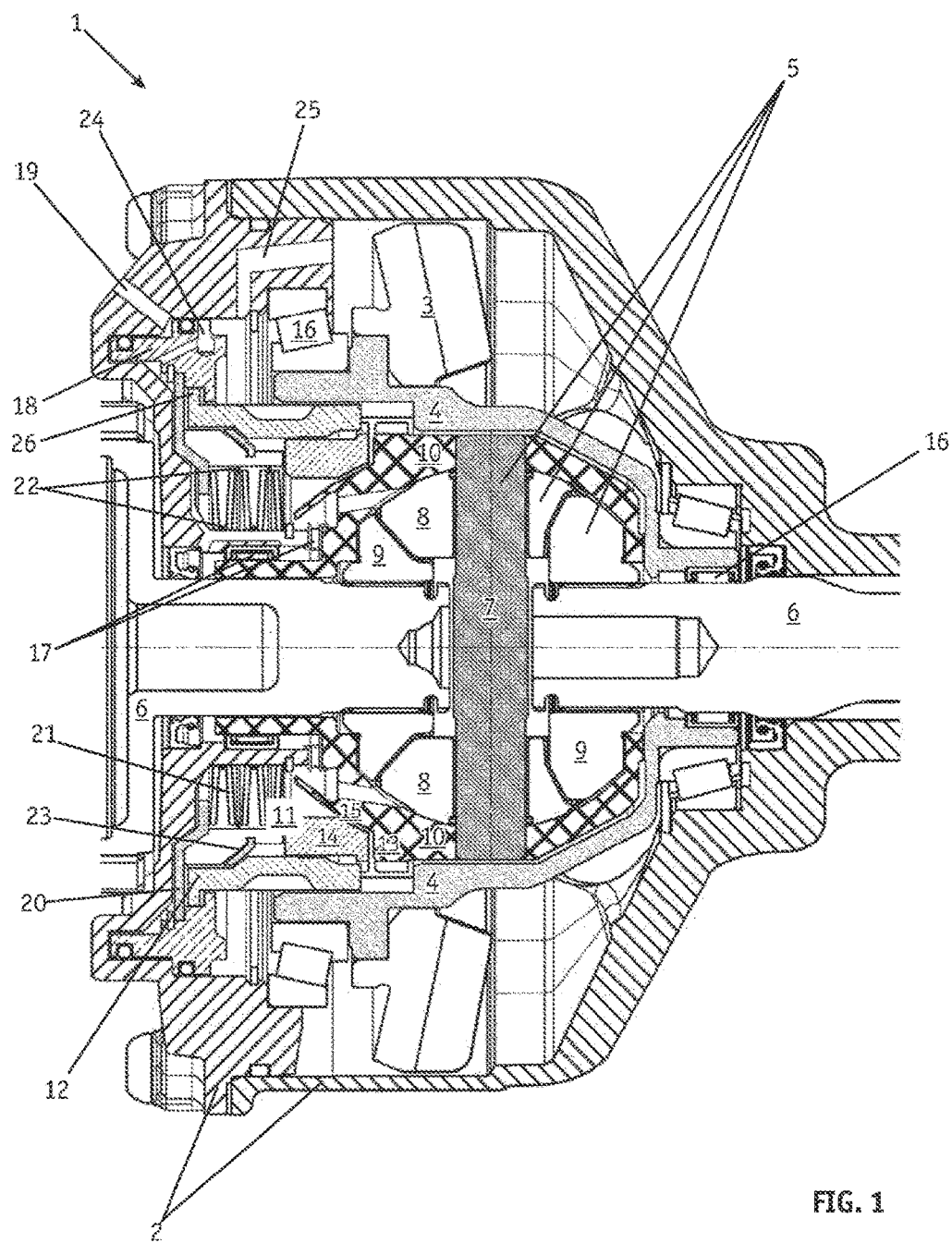
FIG. 1 shows an example axle differential of a passenger car having a clutch device for decoupling the input member from the output members.

FIG. 1 shows a differential 1 of a passenger car which is received in a differential housing 2. The input member is formed by a ring gear 3 which is arranged at the outer side on a differential basket in a rotationally secure manner. The drive power which is introduced via the ring gear 3 into the differential 1 (a longitudinal shaft and a drive wheel which is in engagement with the ring gear 3 in order to form an angular gear are not shown) is transmitted via the differential members (7, 8, 9) of a differential mechanism 5 to two output members 6 of the differential 1 in a branched manner, which members then transmit the drive power via lateral shafts to the drive wheels which are associated with the axle. Differential members of the differential mechanism 5 are in particular a compensation wheel carrier 7, the compensation wheels 8 and the lateral wheels 9. In this regard, the differential shown in FIG. 1 does not differ from the basic structure of a conventional differential.

Unlike conventional differentials, however, the construction illustrated in FIG. 1 has not only a single differential basket but also an external differential basket 4 and an internal differential basket 10 which can be coupled to each other or decoupled from each other via a clutch device 11. This is carried out against the background that the total drive train of the vehicle, for which the differential illustrated in FIG. 1 is provided in accordance with, is a drive train having a permanently driven primary drive train portion and a secondary drive train portion which can be connected or disconnected. The construction of the differential 1 which is illustrated in FIG. 1, and which is provided as a secondary drive train component for the secondary drive train, is used in particular to decouple a portion of the secondary drive train not only from the primary drive train, which can be carried out via a PTU which is provided in the region of the primary axle or other clutch device, but also at the same time to decouple it from the secondary drive wheels in order to be able to completely stop the portion of the drive train located between the PTU or other clutch device and the clutch device of the differential.

The clutch device 11 has an axially displaceable sliding bushing 12 which cooperates with the external differential basket 4 via an external tooth arrangement in a positive-locking manner. The sliding bushing 12 which is shown in FIG. 1 in a Disconnect position in which the internal differential basket 10 can rotate freely with respect to the external differential basket 4 can be moved via a hydraulically actuated coupling and synchronization mechanism 11 into a Connect position, in which an internal tooth arrangement of the sliding bushing 12 moves into engagement with the internal differential basket 10 or, as in FIG. 1, with a carrier ring 13 which is provided on the internal differential basket 10 in a rotationally secure manner. In the Connect position, the drive power is then transmitted to the internal differential basket 10 from the external differential basket via the external and internal tooth arrangement of the sliding bushing 12.

A synchronous ring 14 cooperates with the sliding bushing 12 via a synchronization 15 and accelerates, in the event of a displacement of the sliding bushing 12 from the Disconnect position into the Connect position, the sliding bushing 12 which is otherwise in the Disconnect position, and the secondary drive train components which are in engagement therewith, to a synchronous speed in order to allow the subsequent engagement of the sliding bushing 12 in the Connect position.

In order to be able to arrange the clutch device 11 with the synchronization unit in a space-saving manner in the differential housing and furthermore near the internal differential basket 10, the external differential basket 4 is constructed in a cup-like manner and is further supported via a roller bearing 16 which is increased in terms of internal diameter with respect to conventional differential basket bearings in the differential housing 2 which stops during Disconnect operation and which does not cause any friction. The internal differential basket 10 which is constructed in a closed manner can thus be readily inserted into the external differential basket 4 and the coupling and synchronization device 11 has space inside the roller bearing 16.

As a result of the described configuration of the external differential basket, actuation members which are necessary for actuating the coupling and synchronization device are in particular prevented from having to engage through the external differential basket, which generally substantially simplifies the construction.

The internal differential basket 10 is supported via additional roller bearings 17 in a low-friction manner in the housing or in the external differential basket 4. The differential members 7, 8, 9 are further supported exclusively inside the closed internal differential basket 10, therefore in particular exclusively with respect to the half-shafts (output members 6) which project into the internal differential basket 10 and/or with respect to the compensation wheel carrier 7 which is located in the internal differential basket 10 and/or with respect to the internal differential basket 10 itself. This has the advantage that the internal differential basket can rotate en bloc during Disconnect operation, and also produce only the compensation movements which occur during travel round bends in respect of the differential members additional power loss taking into consideration the bearing of the internal differential basket 10 via the roller bearings 17 with respect to a purely 2WD vehicle without a connectable secondary axle.

The actuation of the coupling and synchronization device 11 is brought about hydraulically by way of example in the example shown in FIG. 1. Naturally, other actuation mechanisms may also be provided, such as, for example, an electromagnetic actuation or an actuation via a motor-driven ramp mechanism.

The hydraulic actuation mechanism has as a pressure piston an external annular piston 18, wherein the hydraulic pressure chamber is accessible directly via a pressurized oil hole 19 which simply extends only through the differential housing. Complex pressurized oil holes extending into the interior of the housing are thus unnecessary.

Figure 2:
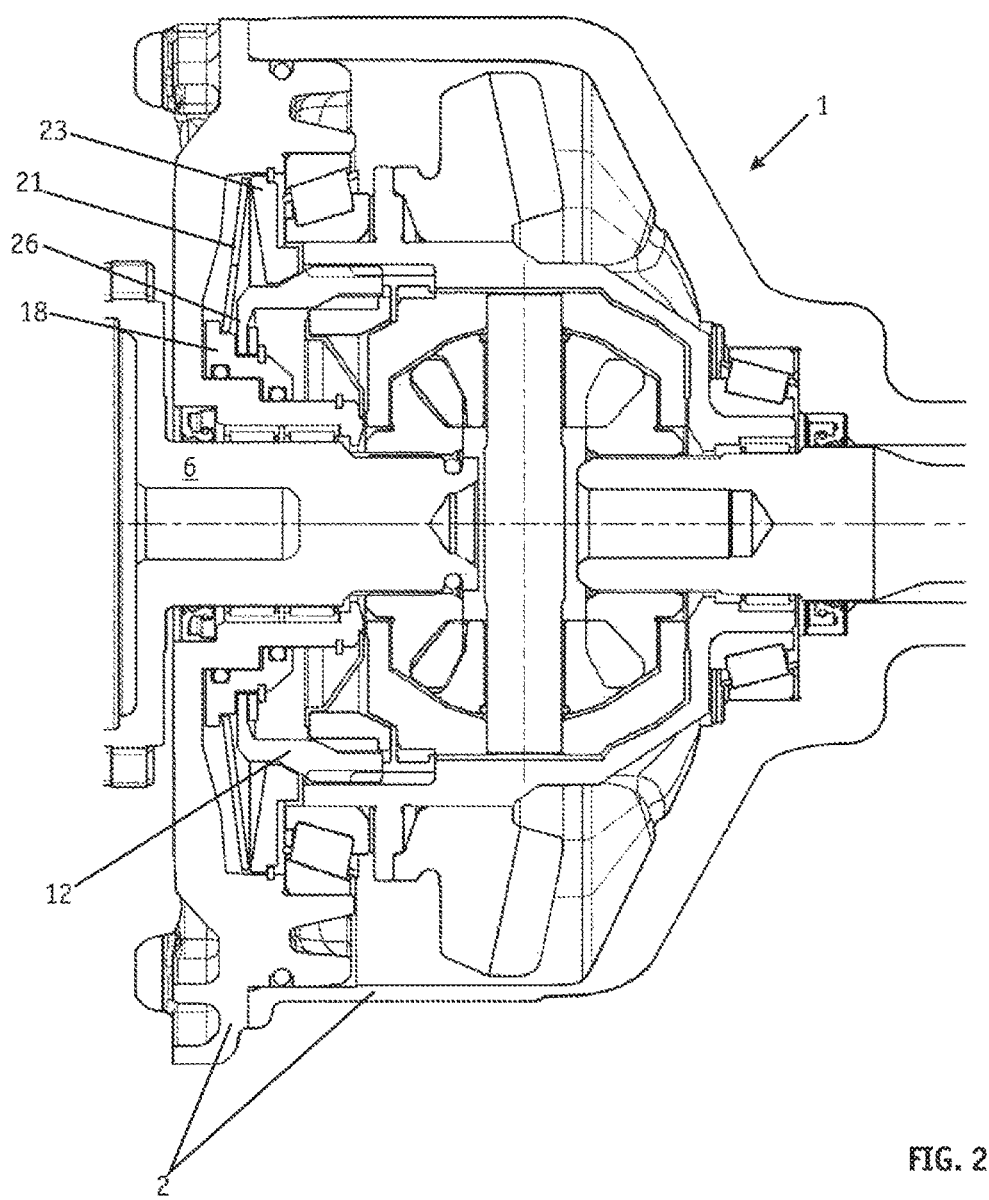
FIG. 2 shows an alternative example of an axle differential to the axle differential shown in FIG. 1.

During the hydraulic actuation of the coupling and synchronization device 11, the annular piston presses via a carrier disk or pressure disk 20 which is axially secured thereto against a disk spring assembly 21 which is secured against axial displacement with respect to the differential housing. That disk spring assembly 21 has a plurality of disk springs which are retained with spacing via spacer rings 22 so that the disk spring assembly 21 can be compressed in the event of loading beyond the zero position thereof, wherein the Connect position of the sliding bushing 12 is reached around the zero position, preferably shortly after exceeding the zero position, so that the energy which has to be provided for the permanent retention of the Connect position can be limited as a result of the degressive resilient behavior. The maximum displacement path of the annular piston 18 or the limitation of the axial displacement path with respect to the differential housing 2 is adapted thereto. Such a spring assembly is schematically illustrated in FIG. 2 with the resilient characteristic. The carrier disk or pressure disk 20 is slotted at the radially internal edge thereof in order to be able to project into the portion of the differential housing, inside which the disk spring assembly 21 is guided. That slotting simultaneously constitutes an anti-rotation member.

At the same time, the disk spring assembly 21 acts as a restoring spring, with which not only is the annular piston 18 urged back out of the position, which it takes up during Connect operation, into the position which it takes up during Disconnect operation (FIG. 1), in the event of decreasing hydraulic pressure, but the relaxing spring assembly 21 also urges, via the carrier disk 20 and the annular piston 18, the sliding bushing 12 over which the annular piston 18 engages in an axial direction out of the Connect position into the Disconnect position. The spring assembly 21 is consequently not only a restoring spring for the annular piston but also further forms the disengagement spring for a resiliently loaded disengagement mechanism of the clutch device.

In addition, the spring assembly 21 urges the sliding bushing 12 with a surface region thereof formed as a braking face against a corresponding braking face of a braking ring 23. This braking ring 23 is supported in the differential housing in a rotationally secure manner and ensures the braking of the secondary drive train components which are intended to be stopped during Disconnect operation of the motor vehicle. As a consequence, with the sliding bushing 12 only a single element has to be provided as an intermediate element between the braking face and the secondary drive train component to be stopped.

In order to construct the effective braking face of the braking ring 23 to be as large as possible despite the extremely small construction space and in order to increase the braking force acting between the braking ring 23 and the sliding bushing 12, the braking faces which act against each other are constructed in a conical manner in the form of a frustoconical surface. Furthermore, the braking ring 23 abuts the differential housing with the surface thereof directed toward the differential housing so that an additional surface pairing is formed between the braking ring and the differential housing, via whose surfaces, which are also preferably constructed to be conical, the braking force is supported on the differential housing. Generally, the braking ring 23 is therefore clamped during the braking operation between the sliding bushing and the differential housing and the braking force is supported against the differential housing in a quite decisive manner with the braking ring 23 being interposed or through the braking ring. The braking ring 23 can thus not only act in a particularly effective manner, but also can be constructed to be thin and space-saving as a result of the shearing loading which occurs almost exclusively during a braking operation.

Therefore, the spring assembly 21 is not only the restoring spring for the annular piston and disengagement spring for the clutch device, but also the braking spring for the braking mechanism.

The resilient element 21 in the example shown in FIG. 1 does not act directly but instead only indirectly, with additional components being interposed on the sliding bushing 12 which ultimately ensures the positive-locking force transmission between the external and internal differential basket. That form of the force flow allows the configuration of play between the sliding bushing 12 and the components which act directly on the sliding bushing during the coupling operation (Disconnect operation=>Connect operation) or during the decoupling operation (Connect operation=>Disconnect operation), that is, the pressure ring 20 and annular piston 18. It is thereby possible for the sliding bushing 12 to be able to rotate during Connect operation in a low-friction manner and free from axial forces and to be supported only on the annular piston 18 or pressure ring 20 when it is in danger of drifting in an axial direction.

As illustrated in FIG. 1, the sliding bushing 12 engages with an axially outwardly projecting carrier collar 26 in a gap between the pressure disk 20 and the annular piston 18. This piston 18 has width dimensions in relation to the axial material thickness of the carrier collar such that the above-described play is ensured. In principle, additional roller members can be provided between the annular piston 18 and the carrier collar 26 and/or between the carrier collar 26 and the pressure disk 20, wherein this has been omitted in the example shown in FIG. 1. This has the background that it is necessary at those locations to support only the forces which have to be applied during the decoupling operation (disengagement of the sliding bushing from the toothed engagement) or coupling operation (engagement of the sliding bushing in the toothed engagement). The sliding bearings which exist at the locations mentioned have been found to be adequate for this purpose.

The annular piston 18 further has a lubrication oil hole 24 which is formed in the annular piston and which moves into alignment with an inlet hole 25 in the differential housing when the annular piston 18 is located in the Connect position so that the lubrication oil supply can be carried out through the annular piston.

FIG. 2 shows an example of an axle differential as an alternative to the example illustrated in FIG. 1. Only the significant differences in relation to FIG. 1 are highlighted below.

The difference substantially involves the arrangement of the pressure piston 18 at one side and the resilient element 21 and braking ring 23 at the other side in relation to the position thereof in the differential housing and in relation to the sliding bushing 12 having been transposed. The pressure piston 23 is located radially inside the resilient element 21 and the braking ring 23 and radially inside the sliding bushing 12. The sliding bushing 12 accordingly has a carrier collar 26 which projects radially inwardly.

Although a disadvantage of this example is that any pressurized oil holes have to be directed to the pressure piston 18 (not shown in FIG. 2) through the differential housing wall in order to be able to guide the pressurized oil past the flange of the left half-shaft 6, the example shown in FIG. 2 also nevertheless has advantages.

Figure 3:
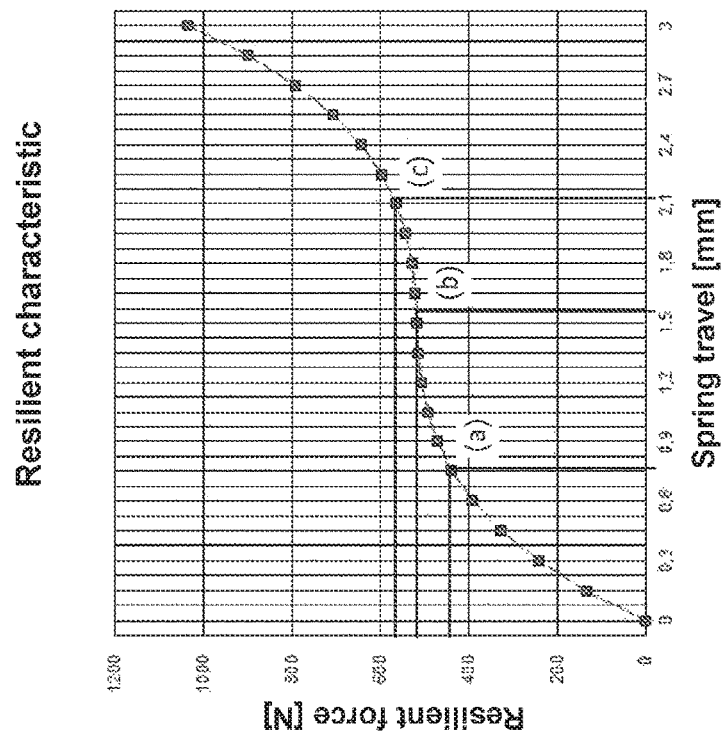
FIG. 3 is a schematic illustration of a spring disk assembly used as a resilient element in the axle differential according to FIG. 1 and the resilient characteristic thereof.
Figure 3:
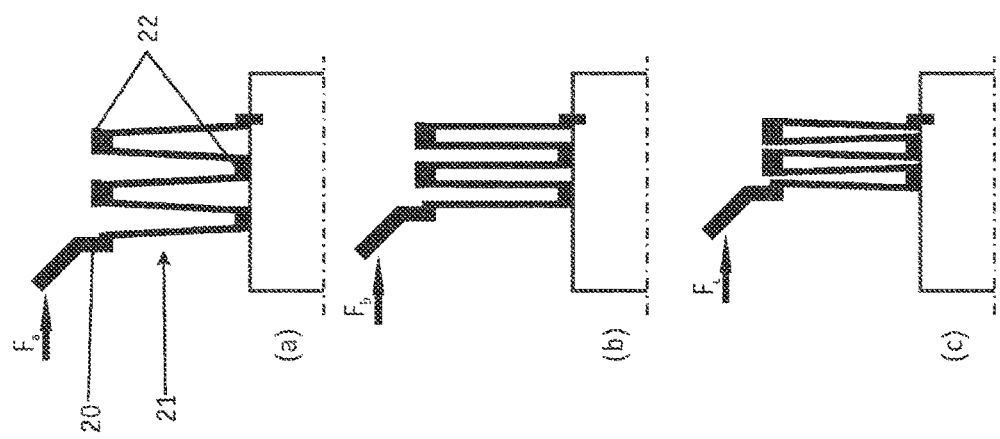

The spring assembly shown in FIG. 1 and FIG. 3 can be replaced with a single resilient element, in particular a single disk spring plate 21 (see also FIG. 4) because such an element is capable of ensuring the necessary spring travel alone as a result of the greater diameter. The resilient forces can be readily influenced by suitable selection of materials and a selection of the material thickness, and a deformation during the coupling operation beyond the zero position is also possible, but a more advantageous, truly negative resilient characteristic can better be produced with respect to the spring assembly shown in FIG. 1 with only a single disk spring plate, which FIG. 3 and FIG. 4 described below illustrate.

Another particular feature of the example shown in FIG. 2, which feature can also nevertheless be used in the example shown in FIG. 1, is that the internal differential basket is supported only on the output members. There are provided no radial bearings, via which the internal differential basket 10 is supported in the differential housing 2.

Figure 4:
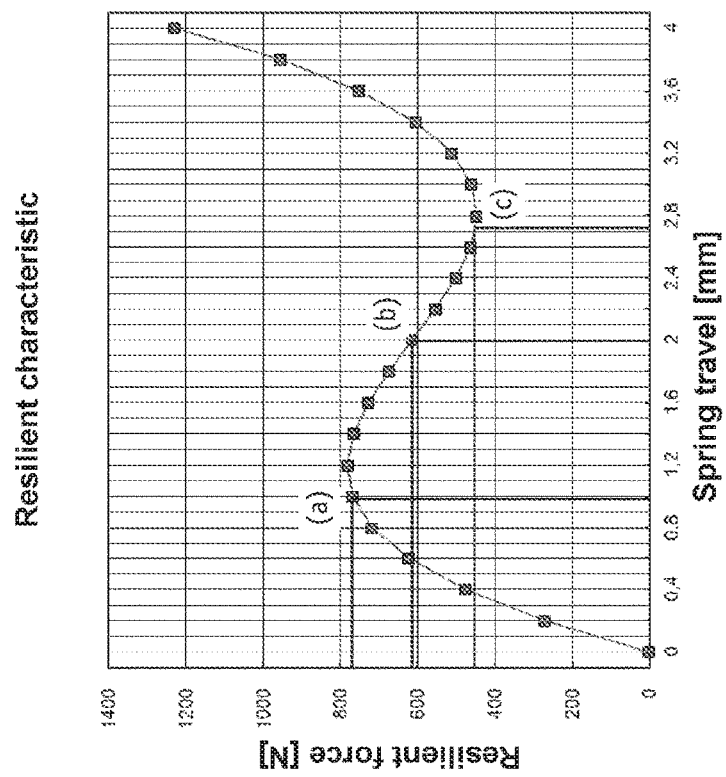
FIG. 4 is a schematic illustration of an individual disk spring which can be used as a resilient element in the axle differential according to FIG. 2 and the resilient characteristic thereof.
Figure 4:
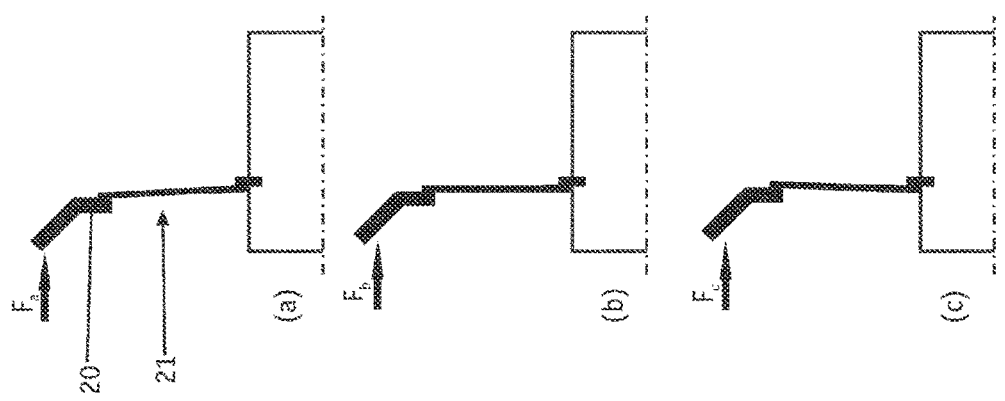

FIG. 4 shows the resilient element 21 which has already been discussed above as a single disk spring and FIG. 3 shows it as a disk spring assembly in three different states (a), (b) and (c). The state (a) shows the Disconnect state, in which no external actuation forces act on the resilient element and the braking device provides the braking force. The state (c) shows the Connect state, in which the resilient element 21 is compressed beyond the zero position in the examples illustrated in FIG. 3 and FIG. 4, which is possible in the disk spring assembly as a result of the arrangement of the spacer members 22 which can be displaced in an axial direction and which space apart the individual disk springs of the assembly from each other in order to ensure the desired degressive resilient characteristic. The state (b) explains an intermediate state, in this instance approximately the respective zero position of the resilient element.

With reference to the resilient characteristic of the individual disk spring, which characteristic is shown in FIG. 4 and is negative in the relevant part-region, it can be seen that the resilient force $F_a$, which is intended to be applied to the carrier disk and which is necessary in order to compress the spring assembly (start of the coupling operation Disconnect=>Connect), is greater in spite of the continuing engagement of the resilient element than the resilient force $F_c$ which is necessary to retain the spring assembly in the state (c) (Connect operation). The resilient force $F_b$, which is intended to be applied at the minimum to the spring assembly during passage through the zero position in order to continue the coupling operation is therefore preferably between $F_a$ and $F_c$ ($F_a > F_b > F_c$).

When the disk spring assembly shown in FIG. 3 is used, a truly negative resilient characteristic cannot readily be produced with a reasonable level of structural complexity so that the disk spring assembly used as a resilient element has, in the part-portion which is relevant to the described application, a substantially degressive characteristic in which the resilient force $F_a$ which is intended to be applied to the carrier disk and which is necessary in order to compress the spring assembly (start of the coupling operation Disconnect=>Connect), is only slightly less, in spite of the continuing compression of the spring assembly, than the resilient force $F_c$ which is necessary in order to retain the spring assembly in the state (c) (Connect operation).

The active actuation force which has to be permanently provided during Connect operation can thus be minimized with a high passive braking actuation force being simultaneously ensured.

The invention claimed is:

1. A differential of a motor vehicle, comprising:
   an input member and at least two output members; and
   a differential unit that acts in a positive-locking manner and that is arranged between the input member and output members, and via which drive power flow is transmitted from the input member to the output members, and
   a clutch device between the input member and the output members, by which the output members and the input member can be decoupled from each other;
   wherein there is provided on the differential a braking device which applies a braking force to the input member or to drive train components which are connected to the input member in a rotationally secure manner when the output members are decoupled from the input member.

2. The differential of claim 1, wherein the differential has an external differential basket that is connected to the input member, and an internal differential basket that receives a differential mechanism.

3. The differential of claim 2, wherein the differential comprises a synchronization unit that is arranged between the external differential basket and the internal differential basket.

4. The differential of claim 2, wherein the members are guided exclusively inside the internal differential basket.

5. The differential of claim 2, wherein the internal differential basket is exclusively supported in at least one of a differential housing and the external differential basket.

6. The differential of claim 2, wherein the external differential basket is constructed as a laterally open, cup-like differential basket.

7. The differential of claim 2, wherein the external differential basket is supported in the differential housing via an external lateral edge of the lateral opening.

8. The differential of claim 7, wherein at least one of the clutch device, a synchronization, a braking device, and an actuator system are located at least partially radially inside a bearing of the external differential basket.

9. The differential of claim 1, wherein during a connect operation, in which the output members are coupled to the input member in order to transmit drive power, a power flow is ensured from an outer side to an inner side.

10. The differential of claim 1, wherein there is provided a braking ring that is clamped during braking operation between a secondary drive train component, which is connected to the input member in a rotationally secure manner, and the differential housing.

11. The differential of claim 9, wherein a braking device has at least one pairing of braking faces which act against each other in a frictionally engaging manner, wherein the braking faces form a frustoconical surface or constitute portions of a single frustoconical surface.

12. The differential of claim 11, wherein the braking device comprises a resilient element and acts in a resiliently loaded manner on the input member or on a secondary drive train component which is connected to the input member in a rotationally secure manner.

13. The differential of claim 9, wherein a resilient element which provides resilient force for braking operation is integrated in the differential such that a rest state of the resilient element is taken up during a Disconnect operation in which the output members are decoupled from the input member and in which the resilient element provides braking force.

14. The differential of claim 9, wherein a resilient characteristic of a resilient element which provides braking force is negative or degressive.

15. The differential of claim 9, wherein a resilient element is used as a restoring spring of the clutch device.

16. The differential of claim 12, wherein the resilient element is formed by a disk spring assembly or an individual disk spring, and is arranged such that the resilient element can be deformed as far as a zero position thereof or beyond a zero position thereof.

17. The differential of claim 12, wherein the differential has a pressure piston which is located radially externally in relation to the resilient element and coupling members of the clutch device.

18. The differential of claim 12, wherein the differential for actuating the clutch device has a pressure piston and in that lubrication oil is supplied by at least one of the pressure piston for the differential and a bearing thereof.

* * * * *